United States Patent [19]
Foerst

[11] Patent Number: 4,464,117
[45] Date of Patent: Aug. 7, 1984

[54] DRIVING SIMULATOR APPARATUS
[75] Inventor: Reiner Foerst, Gummersbach, Fed. Rep. of Germany
[73] Assignee: Dr. Ing. Reiner Foerst GmbH, Gummersbach, Fed. Rep. of Germany
[21] Appl. No.: 296,488
[22] Filed: Aug. 26, 1981
[30] Foreign Application Priority Data
Aug. 27, 1980 [DE] Fed. Rep. of Germany ....... 3032250
[51] Int. Cl.³ .............................................. G09B 9/04
[52] U.S. Cl. .......................................... 434/67; 434/69
[58] Field of Search ................ 434/43, 59, 62, 66, 434/67, 69, 45, 46, 55–58; 272/1 C, 16–18, 31 B, 31 C

[56]  References Cited
U.S. PATENT DOCUMENTS

| | | | |
|---|---|---|---|
| 2,492,969 | 1/1950 | Crane | 272/17 |
| 3,309,795 | 3/1967 | Helmore | 272/1 C |
| 3,513,246 | 5/1970 | Fisch et al. | 434/55 |
| 3,618,256 | 11/1971 | Monks | 272/1 C |
| 3,865,430 | 2/1975 | Tanus | 272/18 |
| 3,923,300 | 12/1975 | Tanus | 272/18 |
| 4,077,138 | 3/1978 | Foerst | 434/69 |
| 4,303,236 | 12/1981 | Czarnecki | 272/18 |

Primary Examiner—Vance Y. Hum
Assistant Examiner—Leo P. Picard
Attorney, Agent, or Firm—Becker & Becker, Inc.

[57]  ABSTRACT

Apparatus for vehicle driving simulation including a cabin capable of being swivelled and having therewith a screen, control devices and the driver's seat, from where the road picture can be observed and controlled. The cabin is capable of being swivelled around an axis which is parallel to the viewing direction and above the center of gravity of the driver. The cabin is driven by a power drive dependent upon the signal of the centrifugal acceleration via a control amplifier and by use of a measuring device, a tipable back which is driven by a power drive dependent upon the acceleration signal via a control amplifier, elastic buffers which support the driver's seat and a vibrator which is intermittingly switched on dependent upon the rotation signal via a frequency divider and a control amplifier.

1 Claim, 10 Drawing Figures

DRIVING SIMULATOR APPARATUS

The present invention relates to apparatus for the simulation of a ride on a curved road using a screen for the picture of the road observed in perspective by the driver as well as using a program for the generation of the road picture as well as using control devices such as an accelerator pedal, a brake pedal, a clutch pedal, a gear shift lever and a ruler which are devices that influence the road picture, as well as using computing devices for the computation of the speed signal, the rotation signal, the acceleration signal and the signal for the centrifugal acceleration, according to U.S. Pat. No. 4,077,138-Foerst, issued Mar. 7, 1978.

Simulators are known with which the monitor picture reacts optically and the loudspeaker acoustically on activation of the control devices, but with which no mechanical reactions on the driver occur. The disadvantage of such simulators is, that the driver regretfully lacks any simulation of the missing acceleration forces of real driving. The illusion of a real car ride consequently is imperfect.

Such simulators are described specifically in U.S. Pat. No. 4,077,138-Foerst, in U.S. Pat. No. 4,196,528-Foerst issued Apr. 8, 1980 and in copending U.S. patent application Ser. No. 165,408-Foerst filed July 2, 1980.

Therefore, it is an object of the present invention, to economically extend and improve the already known simulators by such devices which create for the driver the bodily perceptible feeling of the centrifugal acceleration at the time of travelling in a curve while driving, of the acceleration and the slowing down upon activation of the accelerator and brake pedals, and of the vibration of the vehicle encountered with a rotating engine.

Now, before the solution of this object is set forth, there can be explained briefly which forces dominantly affect the driver during a real car ride:

At the time of travelling in a curve while driving, the centrifugal acceleration is effectively encountered. Direction of the centrifugal acceleration is horizontal and perpendicular to the track or direction of movement of the vehicle and is proportional to the product of track curvature and speed. During changes of the speed, the acceleration or the retardation occurs in track direction. During running or operation of an engine there are effectively encountered periodical forces having frequencies which depend upon the rotation of the engine and such forces are effective in several directions.

This object, and other objects and advantages of the present invention will appear more clearly from the following specification in connection with the accompanying drawings, in which.

Figure 1:
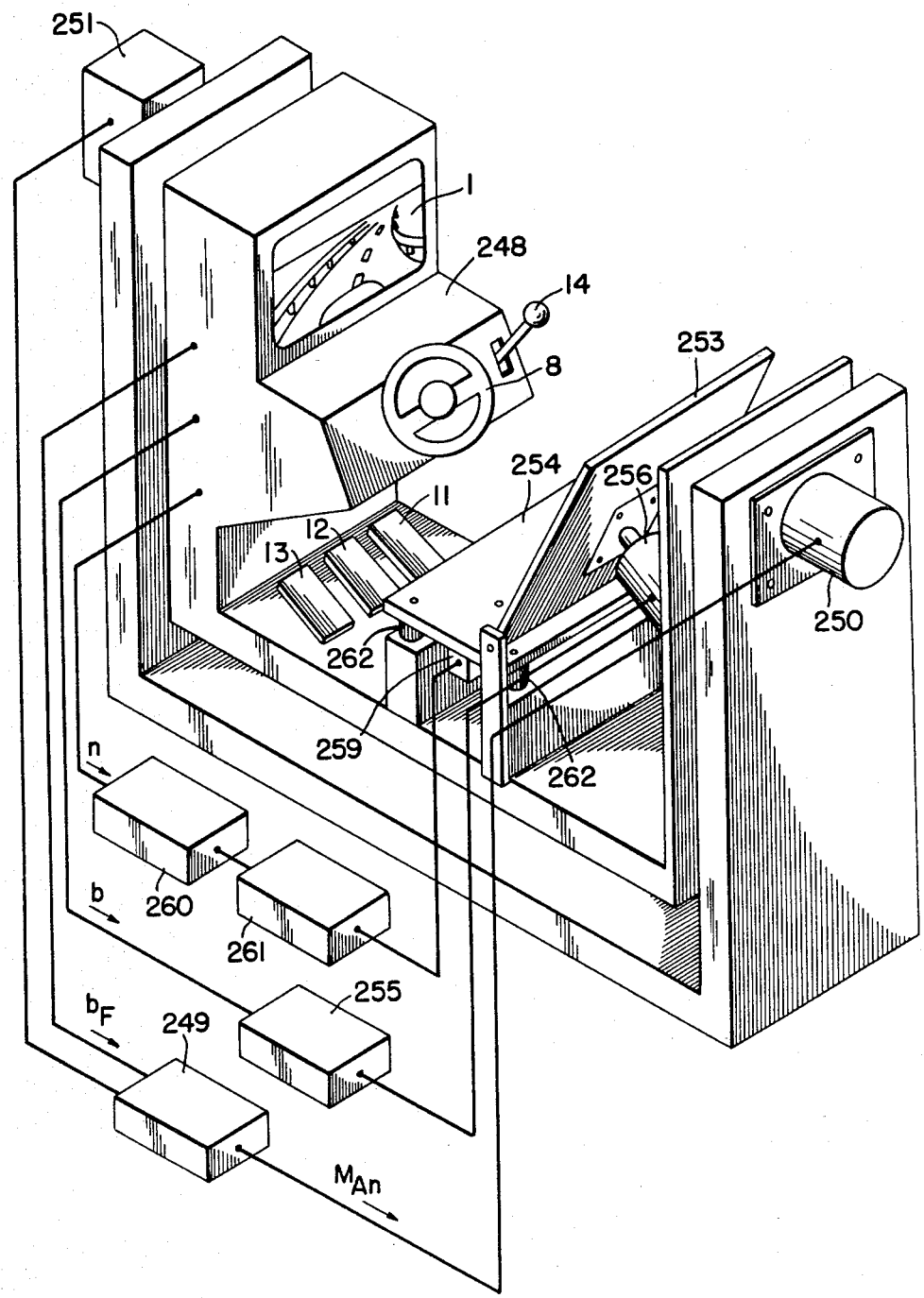
FIG. 1 is a diagrammatic perspective view of the driving simulator apparatus of the present invention.

Referring now to the drawings in detail, FIG. 1 shows a cabin or cab 248 which includes therewith a screen 1, control devices comprising a steering wheel 8, an accelerator pedal 11, a brake pedal 12, a clutch pedal 13 and a gear shift lever 14 and the driver's seat 254 from where the road picture can be observed and controlled; the cabin 248 is capable of being swivelled around an axis which is parallel to the viewing direction and above the center of gravity of the driver. The cabin 248 is driven by a power drive 250 dependent upon a single $b_F$ of centrifugal acceleration via a control amplifier 249 and by use of a measuring device 251 as well as a tipable back 253 which is driven by a power drive 256 dependent upon the acceleration signal b via a control amplifier 255 as well as elastic buffers bottom supports 262 which support the driver's seat 254 and a vibrator 259 which is intermittingly switched on dependent upon a rotational signal n via a frequency divider 260 and a control amplifier 261.

One advantage of this embodiment is the economy thereof. The centrifugal acceleration which is effective horizontally, in reality is composed of factors in the simulation represented by the sum of a real horizontal acceleration and the horizontal component of the gravity in a sloping position. The sloping position, unwanted in principle, does not influence the simulation effect too much since the monitor picture if also sloping, so that there is no change in the angle relatively between the horizon and the driver's seat. The acceleration in longitudinal direction of the road is less relevant for the feeling of driving than the centrifugal acceleration and therefore is simulated only by the pressure of the seal back against the driver's back. Power drives 250 and 256 may be provided in the form of gear motors, rotation field magnets, linear motors, electric magnets, pneumatic and hydraulic drives. Vibrators 259 may be in the form a electrical magnets and eccentric motors.

Figure 2:
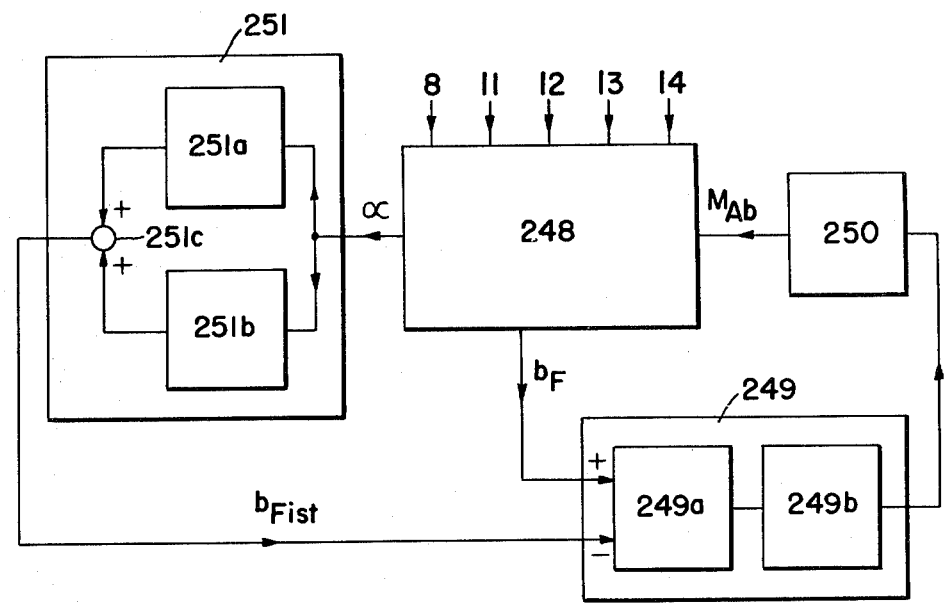
FIG. 2 is a block diagram of an embodiment of circuitry according to the present invention.

FIG. 2 shows a proportional measuring device 251a for the measurement of a swivel angle $\alpha$ of the cabin 248 as well as a differentiating device 251b for the measurement of the time differential of the swivel angle $\alpha$ and an adding device 251c for the addition of said two measuring values and a control amplifier 249 comprising a power amplifier 249b and a controller 249a to the input of which there are supplied both as an actual value the output $b_{Fist}$ of the measuring device 251 and also as a reference value the signal $b_F$ of the centrifugal acceleration. This arrangement is characterized by the fact that the acceleration and the sloping position are controlled independently of the weight of the driver only dependent upon the reference value $b_F$ of the centrifugal acceleration.

Figure 3:
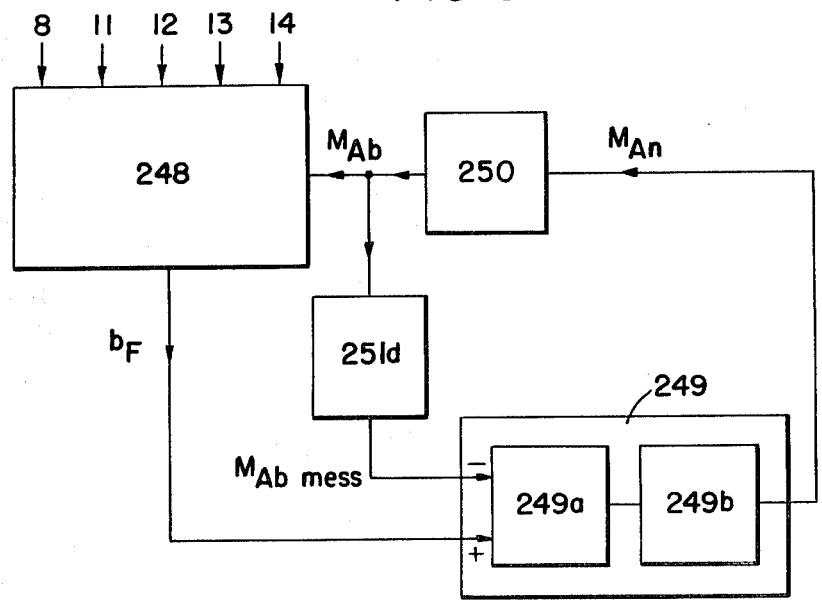
FIG. 3 is a block diagram of another embodiment of circuitry according to the present invention.

FIG. 3 shows a measuring device 251d for the measurement of the output torque $M_{Ab}$ and a power amplifier 249b and a controller 249a to the input of which there are supplied both as an actual value the output $M_{ab\ mess}$ of the measuring device 251d and also as a reference value the signal $b_F$ of the centrifugal acceleration. This arrangement is characterized by the fact that the acceleration and the sloping position depend upon the weight of the driver. An advantage thereof is the fact that the maximum torque of the power drive 250 is utilized.

Figure 4:
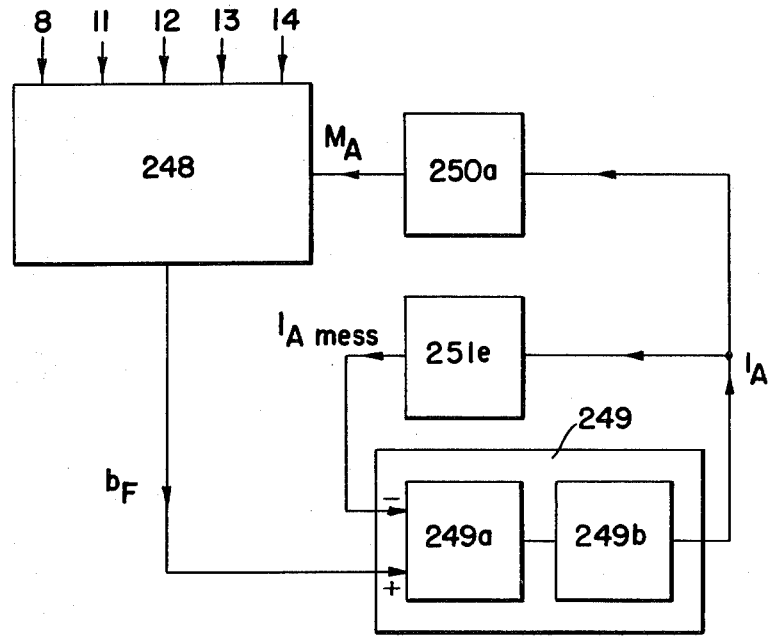
FIG. 4 is a block diagram of another embodiment of circuitry according to the present invention.

FIG. 4 shows a power amplifier 249b and a controller 249a to the input of which there are supplied both as a control value the output $I_{A\ mess}$ of the measuring device 251e and also as a reference value the signal $b_F$ of the centrifugal acceleration. This arrangement has the advantages that a strong torque $M_{Ab}$ at large maximum sloping angle $\alpha$ is generated with an economical effort and that a simple measuring device 251e can be used.

Figure 5:
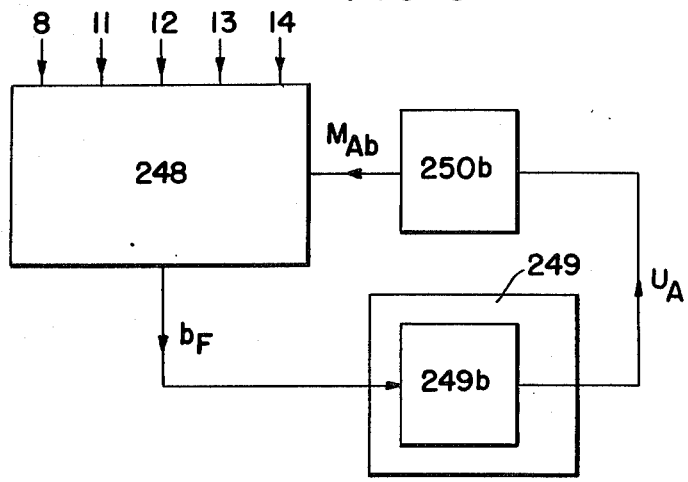
FIG. 5 is a block diagram of a further embodiment of circuitry according to the present invention.

FIG. 5 shows a specific power drive 250b having an output torque, torque $M_{Ab}$ of which is not dependent upon the speed of the swivelling movement and which is proportional to the output $U_A$ of the control amplifier 249 that comprises a proportional power amplifier 249b to which the signal $b_F$ for the centrifugal acceleration is supplied. This arrangement has the advantage that no measuring device at all is necessary. The power driver 250b may be provided for instance as torque motors which generate a constant torque over a large rotational range, which is only proportional to the supplied voltage. As the power amplifier 249b there can be provided and utilized a thyristor drive or a supply circuit with variable resistor at constant voltage.

Figure 6:
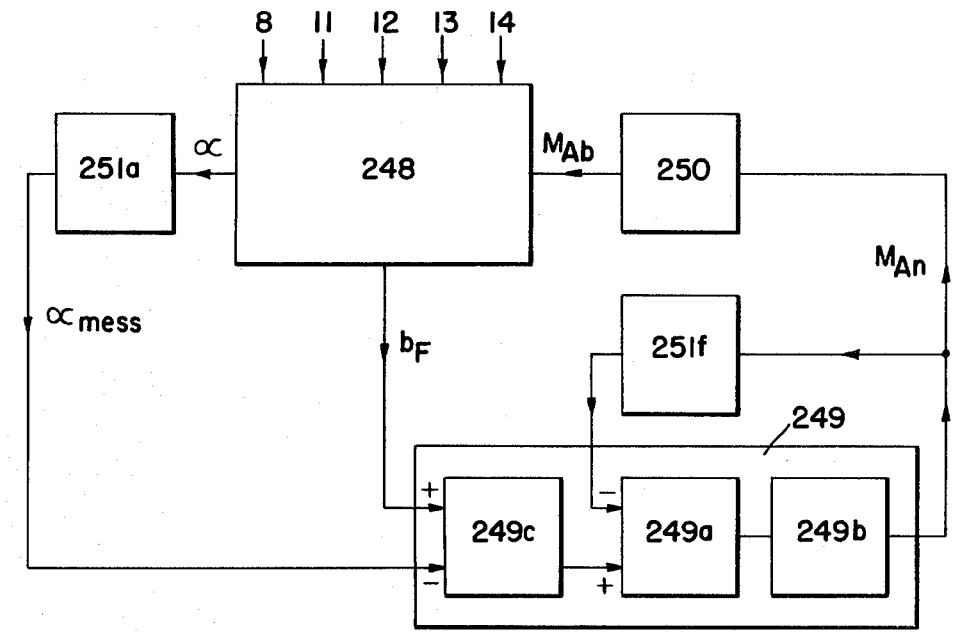
FIG. 6 is a block diagram of a further embodiment of circuitry according to the present invention.

FIG. 6 shows a specific measuring device 251a for the proportional measurement of the swivel angle $\alpha$ wherein said control amplifier 249 comprises a subtraction device 249c by which the output $\alpha_{mess}$ of said measuring device 251a is subtracted from the signal $b_F$ of the centrifugal acceleration wherein said measuring device 251 comprises furthermore a specific measuring device 251f for the measurement of the input torque $M_{An}$ of the power drive 250, and wherein said control amplifier 249 comprises furthermore a controller 249a to which there is supplied both as a reference value the output of the subtraction device 249c and also as an actual value the output of the measuring device 251f, and wherein said control amplifier 249 comprises a power amplifier 249b to which the output signal of the controller 249a is supplied. This arrangement is characterized by the fact that the centrifugal mass of an electrical motor is compensated. This centrifugal mass, valued by the gear ratio, adds during acceleration of the swiveling movement to the mass of the simulator and the driver but at sloping position does not add to the weight.

Figure 7:
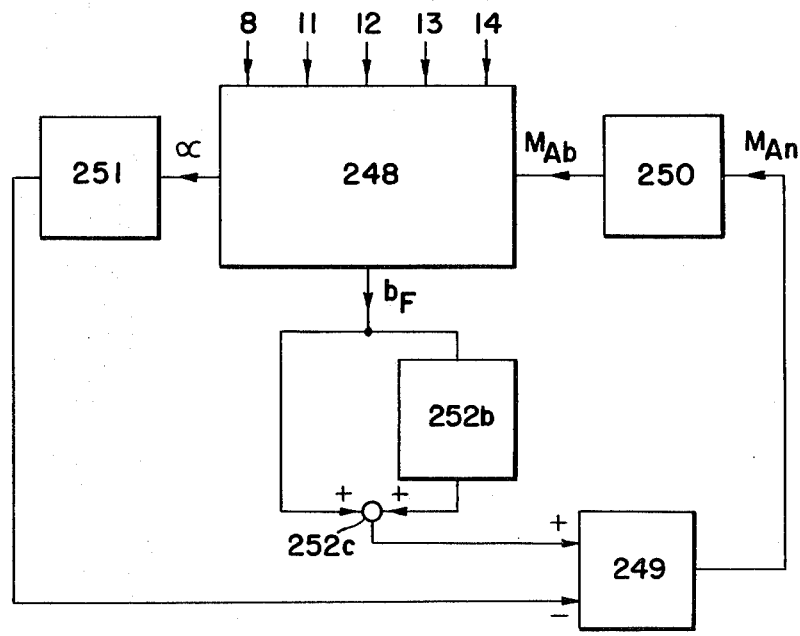
FIG. 7 is a block diagram of another embodiment of circuitry according to the present invention.

FIG. 7 shows a differentiating device 252b for the measurement of the time differential of the signal $b_F$ of the centrifugal acceleration and an adding device 252c by which the output of the differentiating device 252b is added to the signal $b_F$ of the centrifugal acceleration. This arrangement is characterized by the fact that the friction losses of a gear unit are compensated.

Figure 8:
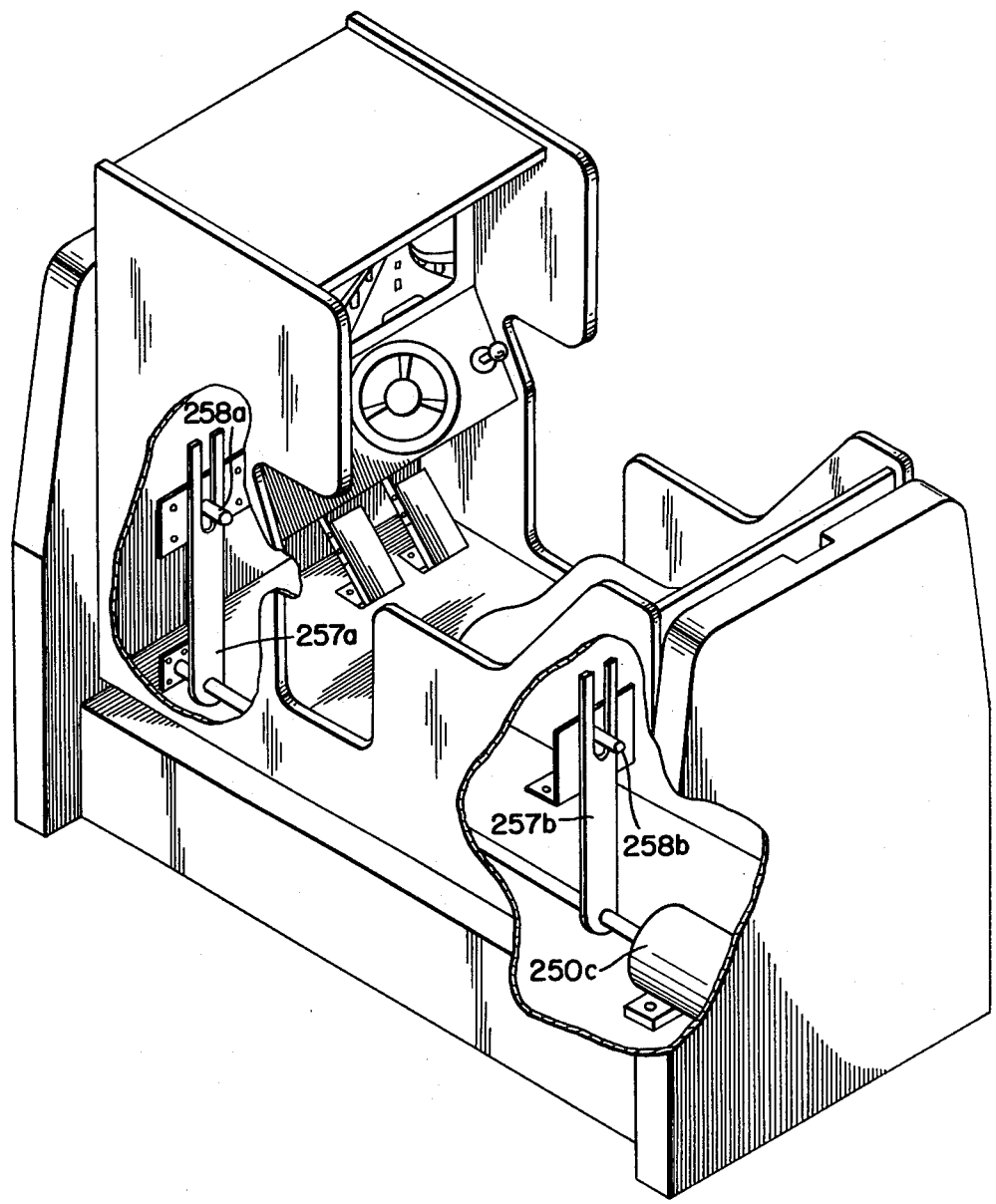
FIG. 8 shows an example of an embodiment of a driving simulator apparatus according to the present invention.

FIG. 8 shows an example of a geometrical design of a driving simulator apparatus with a gear motor 250c which is positioned under the cabin and which drives the cabin via forks 257b and sliding pins 258a and 258b. This arrangement has the advantages of small volume and simple mechanics.

Figure 9:
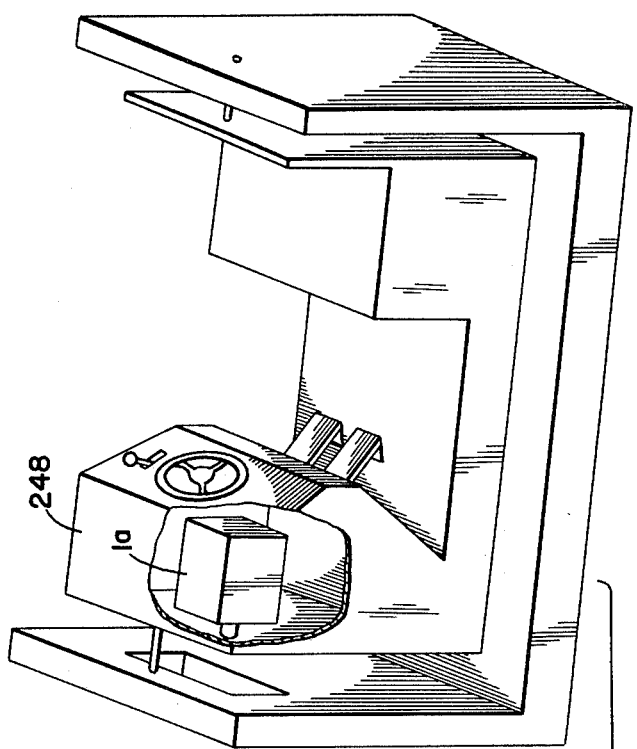
FIG. 9 shows an example of another embodiment of a driving simulator apparatus according to the present invention.
Figure 9:
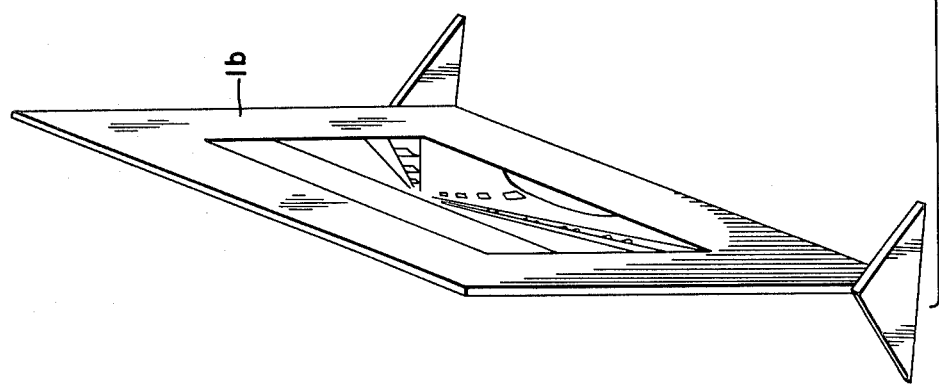

FIG. 9 shows a screen wall 1b, which is not movable and placed in front of the cabin 248 and which is illuminated by a television projector 1a. This arrangement has the advantage that a large road image can be observed over a relatively large distance even though not using a larger and heavier cabin.

Figure 10:
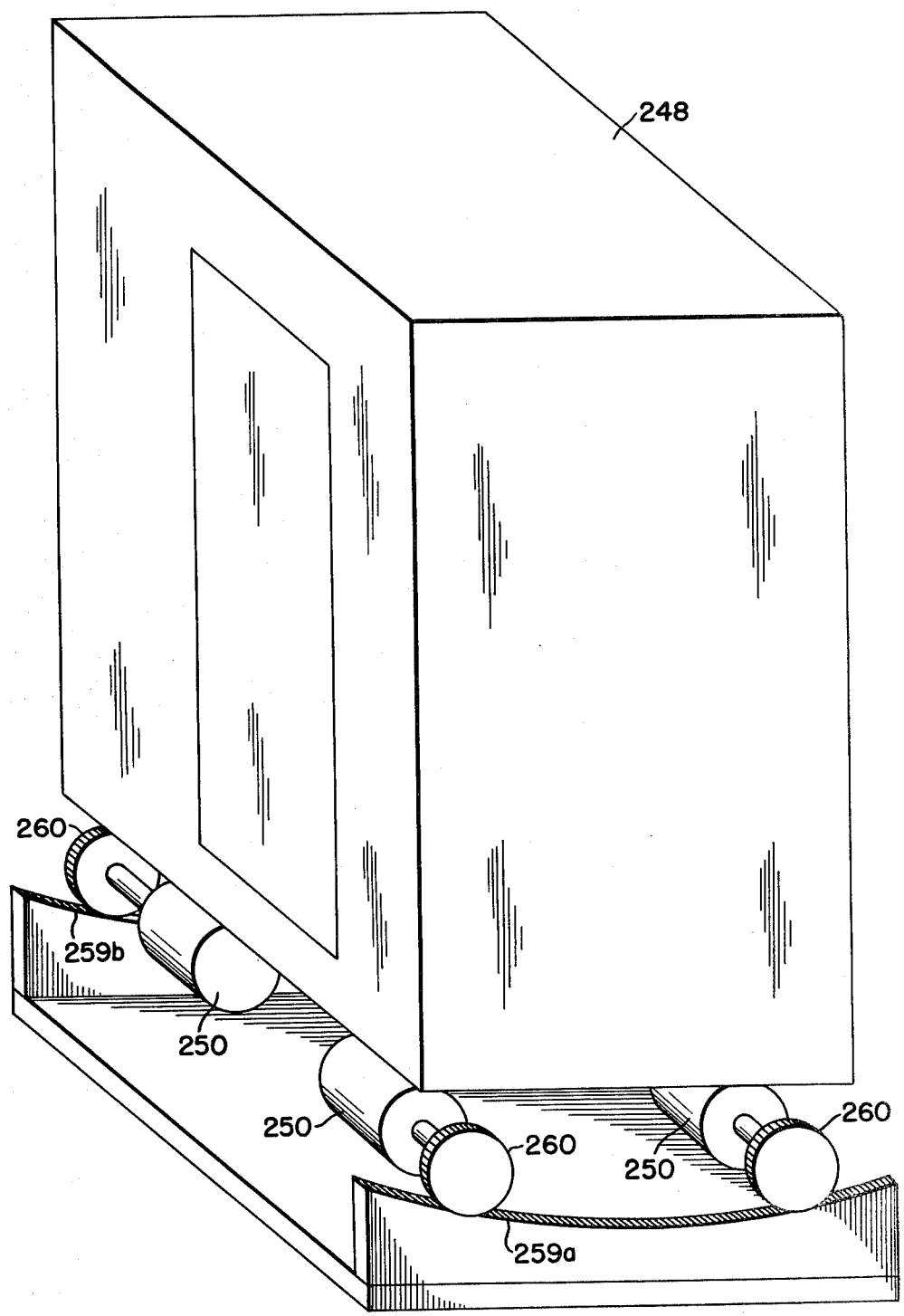
FIG. 10 shows an example of a further embodiment of a driving simulator apparatus according to the present invention.

FIG. 10 shows that the cabin 248 is placed on immovable concavely bent gear bars 259a and 259b by use of gear reels 260 which are driven by one or several electrical motors 250. This arrangement has the advantages that the stand can be designed low and consequently very robust and that the axis virtually can be chosen relatively high by using a correspondingly large radius of the gear bars. Other advantages are that the motors can be cabled or equipped with immovable cables and that gear units for the motors may not be necessary. In FIG. 10 the cabin 248 is shown for example closed at the top and at the sides.

In summary, the present invention relates to a device for the simulation of a vehicle ride along a curved road using a screen for the picture of the road, observed in perspective by the driver as well as using a program for the generation of the road picture as well as using control devices such as accelerator pedal, brake pedal, clutch pedal, gear shift lever and ruler that are devices which influence the road picture, as well as using computing devices for the computation of the speed signal, the rotation signal, the acceleration signal and the signal for the centrifugal acceleration with incorporation of features, according to U.S. Pat. No. 4,077,138-Foerst issued Mar. 7, 1978; the device of the present invention is characterized by a cabin which is incapable of being swivelled and which includes the screen, the control devices and the driver's seat from where the road picture can be observed and controlled; the cabin is capable of being swung or swivelled around an axle which is parallel to the viewing direction and above the center of gravity and the driver and the cabin is driven by a power drive dependent upon the signal for the centrifugal acceleration via a control amplifier and by use of a measuring device, a tipable back which is driven by a power drive dependent upon the acceleration signal via a control amplifier, elastic buffers which support the driver's seat and a vibrator which is intermittantly switched on dependent upon the rotational signal via a frequency divider and a control amplifier.

The measuring device in one embodiment is characterized by a proportional measuring device for the measurement of the swivel angle of the cabin, a differentiating device for the measurement of the time differential of the swivel angle and an adding device for the addition of said two measuring values; the control amplifier comprises a power amplifier and a controller to the input of which there are supplied both as an actual value the output of the measuring device and also as reference value the signal for the centrifugal acceleration.

The power drive in a sample embodiment comprises a measuring device for the measurement of the output torque and the control amplifier comprises a power amplifier and a controller to the input of which there are supplied as an actual value the output of the measuring device and also as a reference value the signal of the centrifugal acceleration.

The power drive alternately is an electrical motor having an armature current thereof measured by a measuring device and the control amplifier comprises a power amplifier and a controller to the input of which there are supplied both as an actual value the output of the measuring device and also as a reference value the signal of the centrifugal acceleration.

The power drive in another embodiment is a specific power drive having an output torque not dependent upon the speed of the swiveling movement and proportional to the output of the control amplifier; the control amplifier comprises a proportional power amplifier to which the signal for the centrifugal acceleration is supplied.

Alternately, the measuring device comprises a specific measuring device for the proportional measurement of the swivel angle wherein the control amplifier comprises a subtraction device by which the output of said measuring device is subtracted from the signal of the centrifugal acceleration and wherein the measuring device comprises furthermore a specific measuring device for the measurement of the input torque of the power drive and wherein the control amplifier comprises furthermore a controller to which there is supplied both as a reference value the output of the subtraction device and also as an actual value the output of the measuring device is supplied thereto, and wherein the control amplifier comprises furthermore a power amplifier to which the output signal of the controller is supplied.

Alternately, the measuring device comprises a differentiating device for the measurement of the time differential of the signal of the centrifugal acceleration and an adding device by which the output of the differentiating device is added to the signal of the centrifugal acceleration.

In another embodiment, the power drive is a gear motor which is positioned under the cabin and which drives the cabin via forks and sliding pins.

In a further embodiment the screen is a screen wall, which is immovable and placed in front of the cabin and which is illuminated by a television projector.

Alternately the cabin is placed on immovable concavely-bent gear bars by using gear reels which are driven by one or several electrical motors.

The present invention is, of course, in no way restricted to the specific disclosure of the specification and drawings, but also encompasses any modifications within the scope of the appended claims.

What I claim is:

1. An apparatus for simulation of a vehicle ride along a curved portion of a road, wherein the apparatus utilizes a viewing screen for displaying a picture of the road in perspective as observed by the driver as well as utilizing a program for the generation of the road picture and using manual controls including an accelerator pedal, brake pedal, clutch pedal and gear shift lever, and a measurement device to influence the picture of the road; the apparatus further including devices for producing a speed signal, a rotational signal, a longitudinal acceleration signal and a signal indicative of centrifugal acceleration, the apparatus in combination comprising:

a supporting frame;

a cab having first and second ends and a longitudinal axis extending above the center of gravity of the cab, the viewing screen for displaying the road picture and the manual controls being located at the first end of the cab and a seat with a tiltable back, bottom and elastic bottom supports being located at the second end of the cab, in which seat the driver sits when viewing the screen and operating the manual controls;

swivel means for mounting the cab in the supporting frame for tilting about the longitudinal axis;

a gear motor positioned beneath the cab and having a shaft extending beneath the cab parallel to the longitudinal axis thereof, the shaft having a first vertical fork receiving a pin on the cab adjacent to the first end thereof and a second vertical fork receiving a pin on the cab adjacent the second end thereof, wherein as the motor rotates the shaft, the cab tilts to simulate centrifugal force on the cab;

means connected to the controls for providing an output signal indicative of the centrifugal force to be simulated on the cab by a desired angle or tilt of the cab;

means connected to the cab for measuring the angle of tilt of the cab, which angle is indicative of the centrifugal force simulated on the cab, the measuring means having an output indicative of the actual angle of tilt;

control means having an output for driving the gear motor, the control means including means for measuring the output thereof; a first subtraction circuit for subtracting the actual angle of tilt from the desired angle of tilt and for providing an output signal indicative of the difference; a second subtraction circuit connected to the first subtraction circuit and to the output measuring means for subtracting the actual output of the control from the output of the first subtraction circuit to provide an output which compensates for the centrifugal mass of the electric gear motor; and a power amplifier connected to the output of the second subtracting circuit and to the gear motor to amplify the output of the second subtracting circuit for driving the gear motor;

an additional power drive disposed between the tiltable back of the seat and cab for tilting the back toward the viewing screen to simulate acceleration and for tilting the back away from the screen to simulate braking;

means for connecting the additional power drive to the accelerator and brake controls;

a vibrator disposed between the cab and bottom of the seat for simulating engine vibrations, and means for connecting the vibrator to the accelerator for increasing the intensity of the vibrations as the accelerator is depressed.

* * * * *